United States Patent
Beier et al.

(10) Patent No.: US 6,698,242 B1
(45) Date of Patent: Mar. 2, 2004

(54) BRITTLE ARTICLE COMPRISING JOINED-TOGETHER HARDENED GLASS AND/OR GLASS-CERAMIC PARTS AND METHOD OF MAKING SAME

(75) Inventors: Wolfram Beier, Essenheim (DE); Ulrike Beer, Mainz (DE); Roland Schnabel, Hofheim (DE); Evelin Weiss, Mainz (DE); Stefan Hubert, Bubenheim (DE); Patrik Schober, Mainz-Ebersheim (DE); Rainer Liebald, Nauheim (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/504,230

(22) Filed: Feb. 15, 2000

(30) Foreign Application Priority Data

Feb. 17, 1999 (DE) .......................... 199 06 521

(51) Int. Cl.⁷ ................................. C03C 8/24
(52) U.S. Cl. .................. 65/43; 65/41; 65/59.1; 65/59.22; 219/600; 219/633; 228/903
(58) Field of Search ............... 65/41, 43, 59.1, 65/59.22; 219/600, 633; 228/903

(56) References Cited

U.S. PATENT DOCUMENTS

| 4,066,427 | A | * | 1/1978 | Goto | .............................. 65/40 |
|---|---|---|---|---|---|
| 4,506,126 | A | * | 3/1985 | Smets et al. | .............. 219/10.53 |
| 4,580,550 | A | * | 4/1986 | Kristen et al. | ................. 126/39 |
| 5,372,298 | A | * | 12/1994 | Glaeser | ....................... 228/121 |
| 5,684,362 | A | * | 11/1997 | Togawa | ....................... 313/582 |
| 5,820,991 | A | * | 10/1998 | Cabo | ........................... 428/432 |

FOREIGN PATENT DOCUMENTS

| AT | 384 605 | 5/1987 |
|---|---|---|
| DE | 649 620 | 8/1937 |
| DE | 21 09 902 | 3/1979 |
| GB | 977648 | 12/1964 |

* cited by examiner

Primary Examiner—Deborah Jones
Assistant Examiner—Andrew Piziali
(74) Attorney, Agent, or Firm—Michael J. Striker

(57) ABSTRACT

In the method according to the invention cold or unheated hardened glass and/or glass-ceramic parts are bonded together with a metallic ductile joining material, preferably silver, copper, aluminum or an alloy of those metals, to form a brittle article. The parts to be joined in an initial unheated state are placed with the metallic ductile joining material between them in a high frequency alternating field with frequencies preferably from 100 to 500 kHz. Then the joining material is inductively heated locally to melt it by means of the alternating field and the parts are pressed together to form a sufficiently strong bond between the parts.

8 Claims, No Drawings

BRITTLE ARTICLE COMPRISING JOINED-TOGETHER HARDENED GLASS AND/OR GLASS-CERAMIC PARTS AND METHOD OF MAKING SAME

BACKGROUND OF THE INVENTION

1. Field of the Invention

The present invention relates to a brittle article or body comprising joined-together hardened glass parts and/or glass-ceramic parts with a small linear thermal expansion coefficient. The hardened glass parts and the glass-ceramic parts are joined together to form the brittle article by means of a joining or bonding material. The present invention relates to a method of making a brittle article of this type.

2. Prior Art

In certain glass or glass-ceramic applications it is necessary to bond or join-together hardened glass parts and/or glass-ceramic parts that are present in a cold or unheated initial state.

Joining glass parts functioning as respective partners, which are cold in an initial state, in an article by bonding by means of inorganic adhesives and silicones as bonding means is known in the art. However with glass-ceramic parts functioning as partners to be joined together, which are cold in the initial state, and which have known very small linear thermal expansion coefficients, these inorganic adhesives generally fail under great thermal stress, since they have a widely varying linear thermal expansion coefficients in contrast to the glass-ceramic material.

Silicone adhesives are known as a joining or bonding material for joining glass-ceramic parts into an article, especially a sunken cooking panel, which bond the joined partners together. Silicone adhesives generally have the property that they are heat-resistant only up to a maximum of 300° C. and thus are questionable for heated regions. Furthermore these adhesives can be weakened or loosened under pressure, heat and moisture, so that a permanent bond or seal is not guaranteed in cooking on or in sunken glass-ceramic cooking panels.

An additional disadvantage is that the adhesive joining materials are not very resistant to abrasive agents, to which they are subjected during cleaning processes, or to mechanical stresses in cooking processes (stirring, grating, etc).

Silicone adhesive materials can be resistant to food materials in the sense of complying with food regulations and laws, however a psychological problem exists with a user or operator, when he or she prepares his or her food also on a so-to-say "rubber packing or sealing element", because he or she fears contamination that will at least spoil the taste of the food.

Furthermore it is known to join glass parts with large linear thermal expansion coefficients as joined partners in an article or body by means of solder. Low melting glass solder is applied as a joining material between the surfaces of the glass parts to be bonded together and is heated in an oven until it melts. A strong joint connection arises when the glass-solder solidifies. Generally these bonding methods are of questionable applicability because of the extreme differences of the thermal expansion coefficients between the normal glass an glass-ceramic materials and also because the glass solder for joining glass-ceramic parts or hardened glass parts is brittle.

SUMMARY OF THE INVENTION

It is an object of the present invention to provide a mechanically and thermally sufficiently stable bond or joint connection between hardened glass and/or glass-ceramic parts, which are cold in their initial state, i.e. between glass-ceramic and glass-ceramic parts, but also between glass-ceramic and hardened glass parts or between hardened glass and hardened glass parts.

It is another object of the present invention to provide a brittle article or body comprising joined-together hardened glass parts and/or glass-ceramic parts with small linear thermal expansion coefficients that has improved thermal and mechanical stability.

It is an additional object of the present invention to provide a method of making this thermally and mechanically stable brittle article or body.

These objects, and others that will be made more apparent hereinafter, are attained in a brittle article comprising joined-together hardened glass parts and/or glass-ceramic parts with small linear thermal expansion coefficients.

According to the invention the joining material is a metallic ductile material, that bonds the respective initially cold or unheated hardened glass and/or glass-ceramic parts sufficiently well with each other when the metallic ductile material is inductively heated in order to melt it.

The method of making the above-described brittle article or body comprising joined-together hardened glass parts and/or glass-ceramic parts made from glass-ceramic material with small linear thermal expansion coefficients comprises the steps of:

a) placing the partners to be joined together with a metallic ductile joining material between them in a high frequency alternating field;

b) inductively heating the metallic ductile joining material locally to melt the metallic ductile joining material;

c) pressing the partners to be joined for a predetermined time with a predetermined pressure to form a sufficiently adherent joint connection or sufficiently strong bond between the partners; and d) tempered cooling of the partners joined together in step c).

A joint is formed by the method according to the invention, which is resistant to mechanical and thermal stresses. Since the joining or bonding material is a ductile material, i.e. it is easily shaped, stretched and distended, the partners being joined can easily be securely held together by the bonding material, even when they expand or stretch different amounts when heated because of differing linear thermal expansion coefficients.

Very complex shapes of the brittle articles can be obtained by the methods according to the invention, which are not possible by conventional shaping methods for hardened glass or glass-ceramics.

DE-PS 649 620 describes a method of making a glass shaped body made by joining together glass parts. This method is however based on heating the glass parts to be joined together, the partners to be joined, to a very hot state, preferably hotter than 540° C. This known method may be performed efficiently only with the partners to be jointed directly subjected to the hot shaping process. The partners to be joined must necessarily be very hot, so that they may be bonded with the joining material, aluminum, which is either applied as a cold foil between the parts to be bonded together or which is present as an immersion-melt bath.

This publication thus provides no suggestion or disclosure for the joining together of cold hardened glass or glass-ceramic parts with each other. Partners to be joined together and joining materials, which are in an initial cold state, are bonded together with each other in the method of the present invention with only a local inductive heating of the joining material. Thus the glass or glass-ceramic parts are joined after their shaping process in a timely manner, which is separate from the joining or bonding process.

Of course DE-AS 21 09 902 describes the bonding of two cold glass parts with an initially cold joining material (aluminum), which is heated locally by means of a resistive heating. However a very great bonding pressure has already been applied prior to the heating, since the aluminum was already cold-formed prior to the heating.

According to the invention the heating occurs inductively. Because of that the heating is only applied locally so that the solder is specifically heated and the glass or glass-ceramic material is only heated to a small extent by heat conduction. In the above-described publication a resistive heating is used. A coil around the parts to be joined together is heated, which transfers its heat to the described wall and front panel by heat radiation. This heating method is entirely different from the method used in the claimed invention. The glass parts are thus completely heated by the described wall and front panel, and a limited local heating does not occur, as in the claimed method above.

The known resistive heating thus occurs by means of a heated coil, i.e. by a type of susceptor. That is completely different—clearly less efficient—than the type of inductive heating used in the method of the invention.

In the method of the invention the heat is produced exactly where it is needed, namely at the joint between the partners, by inductive heating. With a heating by means of hot coil/susceptor, in contrast, the heat energy is widely dissipated, i.e. well beyond the desired area to be heated.

GB-PS 977 648 of course suggests different partners to be joined, but the joining process described there necessarily presupposes a pre-treatment of the surfaces joined with melted indium. The alloy forming the joining material must be sufficiently combinable with that material. Only the indium-tin-lead alloy is specifically mentioned as an actual example. This known method thus functions with a completely different system of materials than the claimed invention here, namely with very low-melting metals, indium, lead and tin. The present invention does not employ these metals, but typically aluminum, copper and silver or their alloys are suitable for use as jointing materials in the method according to the invention.

An additional difference between the disclosure of GB-PS 977 648 and the method of the present invention is that the method of this reference does not use an inductive heating of the joining material. Also the above-described alloy can not be designated as a "ductile material", since this alloy cannot be sufficiently shaped or deformed to the same extent as a ductile material.

AT 384 605 concerns the joining of glass parts to glazed window panes by means of thermally activated bonding agents, which are activated by inductive heating, however the bonding agents are not ductile materials and the partners being joined are not hardened glass parts and/or glass-ceramic parts. This publication specifically describes soldering materials, thermally activated adhesive materials and hardenable elastomeric materials.

The joining compounds formed however do not withstand heat to a sufficient extent, i.e. they cannot sufficiently withstand thermal stresses or loads. They are only suited for glass panes for glazing of openings, which are exposed to only slight temperature fluctuations due to changing weather conditions in a comparatively narrow temperature range, however they are not exposed to comparatively high temperatures, e.g. cooking temperatures, and large temperature differences for shaped bodies made from hardened glass and/or glass-ceramic parts.

In preferred embodiments of the method according to the invention silver, copper or aluminum, or alloys or these metals, are used as the metallic ductile joining material.

If silver or alloys of silver are used as the joining material according to one embodiment of the invention, especially in bonded glass-ceramic cooking panels, a very hygienic joint is obtained, since silver has an antibacterial effect. Of course in this case the glass-ceramic joined partners and silver also have very different thermal expansion coefficients, however the different expansion behavior during heating is compensated by the ductility and a small sliver layer thickness, which is in a range of from 0.1 to 3 mm.

Particularly when aluminum is used as the joint material, the joined edges are at least preconditioned with glass solder, a solder pates or a glass flux, in order to guarantee an intimate bonding.

In the case of other ductile materials pre-conditioning has also proven to be appropriate.

The glass parts functioning as the partners to be joined are made from hardened glass. According to Industrial Standard DIN 1259, Part 1, a hardened glass is a chemically resistant and thermally resistant apparatus glass with a high softening temperature and a linear thermal expansion coefficient $\alpha < 6*10^{-6} K^{-1}$, which is especially suitable for the purposes of the invention. Similarly a glass-ceramic material with a correspondingly small linear thermal expansion coefficient is preferably used.

Brittle articles, comprising joined together hardened glass and/or glass-ceramic parts, are preferably sunken cooking panels of cooking ranges, on which foods are immediately or directly prepared, also designated as "cook-on" surfaces.

Additional examples of brittle articles, which are joined together from hardened glass and/or glass-ceramic parts, are described in German Patent Application 198 56 538.0-16. The subject matter of this German Patent Application is incorporated here by reference, especially the additional examples of brittle articles.

The following example illustrates the action and advantages of the methods according to the present invention.

EXAMPLES

Partners to be joined made from either of two correspondingly different materials, known under the trademarks CERAN-HIGHTRANS® and CERAN® COLOR, were joined either with silver (Ag) or aluminum (Al) as joining materials. In a number of exemplary experiments partners to be joined with the joining material between them were placed in a high frequency alternating field having a frequency of 208 kHz and simultaneously pressed together within the coil body generating the alternating field for various joining times and application pressures. The high frequency alternating field was produced within a coil body. These experiments were performed with two different coils A and B.

COIL A:
Three windings, coil length l=110 mm, winding spacing d=9 mm.

COIL B:
One winding, coil length l=580 mm, winding spacing d=8 mm.

The desired results are tabulated in the following TABLE 1.

In examples 1 to 4 two glass-ceramic parts made of CERAN-HIGHTRANS® were joined together in a brittle article with coil A. In examples 5 to 7 two glass-ceramic parts made of CERAN® COLOR were joined together in a brittle article with coil B

TABLE I

STRENGTH OF ARTICLES MADE WITH GLASS-CERAMIC PARTS BY THE JOINING METHOD OF THE INVENTION

|   | COIL | JOINING MEANS/ THICKNESS (mm) | CONDI- TIONING | JOIN- ING TIME (s) | PRES- SURE (Mpa) | STRENGTH |
|---|---|---|---|---|---|---|
| 1 | A | Ag//0.15 | No | 60 | 0.4 | High |
| 2 | A | Ag/0.15 | No | 60 | 0.2 | Medium |
| 3 | A | Al/0.10 | No | 30 | 0.4 | High |
| 4 | A | Al/0.10 | Yes | 30 | 0.4 | Medium to High |
| 5 | B | Ag/0.15 | No | 600 | 0.4 | High |
| 6 | B | Ag/0.15 | No | 900 | 0.4 | Medium |
| 7 | B | Al/0.10 | No | 300 | 0.4 | High |

The results show that the steps of the method according to the invention attain the objects of the invention and achieve the desired results.

This was also clearly demonstrated by an experiment with another sample with two glass-ceramic parts and aluminum as joining material.

For this example, an average strength of 20 MPa for the resulting brittle article was measured in a twin ring bending test with the following parameters:

| | |
|---|---|
| Coil: | A |
| Partners to be Joined: | CERAN-HIGHTRANS ® Parts |
| Joining Material: | Al |
| Frequency: | 208 kHz |
| Joining time: | 50 s |
| Pressure: | 0.4 MPa |
| Conditioning: | Thin solder layer (F-SH 1, Degussa Solder Paste), applied to the joined edges. |
| Sample size: | twice 50 × 25 mm, so that the joined parts have a size of 50 × 50 mm |

The frequency of 208 kHz is only exemplary.

The working frequencies are in a range from 10 kHz to 5 MHz, preferably from 100 to 500 kHz, according to the type of materials used.

The joining time by definition is the time during which the joining material is inductively heated and pressure is applied to the parts to be joined.

The disclosure in German Patent Application 199 06 521.7-45 of Feb. 17, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in brittle articles comprising joined-together hardened glass and/or glass-ceramic parts and method of making same, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of making a cooking panel providing a cooking surface, wherein said cooking panel is made by joining at least two partners together at edges of said at least two partners by a joining means, and said at least two partners are selected from the group consisting of hardened glass parts and glass-ceramic parts each having a linear thermal expansion coefficient less than $6*10^{-6}K^{-1}$, said method comprising the steps of:

a) placing the partners to be joined together in an edge-to-edge relationship with a metallic ductile joining material between said edges of said partners in a high frequency alternating electric field, wherein during the placing only the metallic ductile joining material is arranged between the edges of the partners and said metallic ductile joining material is selected from the group consisting of silver, aluminum, copper, alloys of silver, alloys of aluminum and alloys of copper;

b) inductively heating the metallic ductile joining material locally with the high frequency alternating electric field to melt the metallic ductile joining material;

c) pressing the edges of the partners to be joined together for a predetermined time between 30 and 900 s with a predetermined pressure between 0.2 and 0.4 MPa with only the metallic ductile joining material between said edges to form a bond between the partners, said joining time and said joining pressure depending on the nature of said metallic ductile joining material and a field strength of said high frequency alternating electric field; and d) tempered cooling of the partners joined together in step c), whereby said cooking panel is obtained.

2. The method as defined in claim 1, wherein said metallic ductile joining material is said silver or one of said alloys of said silver.

3. The method as defined in claim 1, wherein said metallic ductile joining material is said copper or one of said alloys of said copper.

4. The method as defined in claim 1, wherein said metallic ductile joining material is said aluminum or one of said alloys of said aluminum.

5. The method as defined in claim 1, wherein said high frequency alternating electric field has a frequency in a range of from 10 kHz to 5 MHz.

6. The method as defined in claim 5, wherein said frequency is from 100 to 500 kHz.

7. The method as defined in claim 1, wherein said at least two partners are said glass-ceramic parts and said cooking panel is flat.

8. The method as defined in claim 1, wherein said metallic ductile joining material is said silver and is present in a layer of thickness from 0.1 to 3 mm so that said predetermined bending strength is at least 20 MPa, wherein a hygienic joint is formed between said at least two partners.

\* \* \* \* \*